United States Patent [19]
Alferness et al.

[11] Patent Number: 6,097,865
[45] Date of Patent: Aug. 1, 2000

[54] DESIGN AND METHOD FOR PLANAR COUPLED WAVEGUIDE FILTER

[75] Inventors: Rodney Clifford Alferness, Holmdel, N.J.; Tomas Brenner, Severna Park, Md.

[73] Assignee: Lucent Technologies Inc., Murray Hill, N.J.

[21] Appl. No.: 09/120,000

[22] Filed: Jul. 21, 1998

[51] Int. Cl.$^7$ ................................ G02B 6/26; G02B 6/34; H04J 14/02

[52] U.S. Cl. .................................. 385/50; 385/37; 385/39; 385/129; 385/131; 359/130

[58] Field of Search .................................. 385/50, 37, 39, 385/129, 131, 10, 49, 132; 359/130

[56] References Cited

U.S. PATENT DOCUMENTS

| | | | |
|---|---|---|---|
| 4,573,163 | 2/1986 | Kaminow | 372/96 |
| 4,750,801 | 6/1988 | Alferness | 385/27 |
| 5,517,589 | 5/1996 | Takeuchi | 385/37 |

*Primary Examiner*—Cassandra Spyrou
*Assistant Examiner*—Fayez Assaf
*Attorney, Agent, or Firm*—Gibbons, Del Deo, Dolan, Griffinger & Vecchione

[57] ABSTRACT

A wavelength filter has a low index waveguide, a high index waveguide and a grating for coupling therebetween. The high index waveguide is in horizontal proximity to said low index waveguide. The low index waveguide and said high index waveguide have substantially different geometries which result in substantially different indices. A method for fabricating the wavelength filter is also disclosed.

14 Claims, 4 Drawing Sheets

DESIGN AND METHOD FOR PLANAR COUPLED WAVEGUIDE FILTER

FIELD OF THE INVENTION

The field of the invention generally relates to devices for optical transmission systems, and more particularly to those networks that include components in the indium phosphite (InP/InGaAsP) materials system for filtering and routing optical signals of different wavelengths.

BACKGROUND OF THE INVENTION

Wavelength filters are key components for wavelength division multiplexed (WDM) photonic networks. Potential applications for wavelength filters are demultiplexers, multiplexers, wavelength add/drop devices, noise filters and so forth. InP/InGaAsP is the material of choice for these filters because it allows for monolithic integration with photonic components such as transmitters, receivers, optical amplifiers, switches, etc. Among the various schemes proposed, the waveguide grating assisted coupler filter is a very attractive candidate due to its compactness, narrow bandwidth and tuneability. The device allows efficient wavelength selective energy transfer from one waveguide into a second waveguide by means of a common periodic structure, referred to as a grating. The wavelength $\lambda$ transferred by the coupler is defined by equation (1).

$$\beta_1 \pm \beta_2 = \frac{2\pi}{\Lambda_g} \quad (1)$$

with waveguide propagation constants $$\beta_k = \frac{2\pi}{\lambda} N_k, \quad (k = 1, 2)$$

and effective indices: $N_k$; and $\Lambda_g$ is the pitch of the grating. The '+' sign applies for backward coupling and the '−' sign applies for forward coupling gratings. This concept is well known (for example see: S. E. Miller, 'Some Theory and Applications of Periodically Coupled Waves', The Bell System Technical Journal, Vol. 8, September 1969; also see: D. Marcuse, 'Directional Couplers Made of Nonidentical Asymmetric Slabs, Part II: Grating Assisted Couplers', Journal of Lightwave Technology, Vol. LT-5, February, 1987), and vertically coupled devices were successfully implemented in the InP/InGaAsP material system (For example see: R. C. Alferness, et al., 'Broadly Tuneable InGaAsP/InP Buried Rib Waveguide Vertical Coupler Filter', Applied Physics Letters, Vol. 60, February 1992).

Typically, photonic integrated circuits are constructed on a planar platform. Therefore, in order to take full advantage of photonic integrated circuits, horizontal waveguide grating filters are preferred for on-chip monolithic integration with other photonic components. Horizontal planar filters comprising dissimilar waveguides by either different etch-depths or by different widths have also been demonstrated (for example see: Polarization-Independent Filtering in a Grating-Assisted Horizontal Directional Coupler', S. Francois et al., IEEE Photonics Technology Letters, Vol. 7, July, 1997; see also: R. Maerz et al., 'Spectral properties of asymmetrical optical directional couplers with periodic structures', Optical and Quantum Electronics, Vol. 19, 1987). A drawback of the prior art devices is that the achieved dissimilarity for these waveguides is around 0.01, where dissimilarity is measured by the index differential, $\Delta N = |N_1 - N_2|$. However, a $\Delta N$ greater than 0.1 is typically desired because most practical applications require larger bandwidths and reduced crosstalk.

SUMMARY OF THE INVENTION

The present invention is a device that increases bandwidth and reduces crosstalk by forming a horizontal grating coupler in the InP/InGaAsP materials system with strongly dissimilar waveguides. The solution of strongly dissimilar waveguides according to the present invention is achieved by substantially different geometries of the waveguides, where a low index waveguide consists of a thin InGaAsP stripe and a high index waveguide consists of a substantially thicker InGaAsP/InP core composite. Importantly, the present invention is well suited for monolithic integration in a planar technology and can be realized in a very economical way by using a single epitaxial growth step for the dissimilar waveguide cores.

In an exemplary embodiment of the present invention, a wavelength filter has a low index waveguide, a high index waveguide and a grating for coupling therebetween. The high index waveguide is in horizontal proximity to the low index waveguide. The low index waveguide and the high index waveguide have substantially different geometries which result in substantially different indices. In alternate embodiments, improved performance may require gradually varying the separation between the waveguides along the longitudinal (z−) direction.

Advantageously, the present invention permits the construction of compact and tunable wavelength filters and may be particularly useful for lightwave networks. Furthermore, the 'high index' waveguide is designed asymmetrically allowing for a wide waveguide width. The waveguide cores are composed of alternate stacks of InP and InGaAsP layers. The therefore relaxed process of the waveguide grating filter is solved in a very economical way involving only a single epitaxial growth step for the waveguide cores, such that the device can be formed reproducibly by means of material selective etchants and appropriate masking layers.

BRIEF DESCRIPTION OF DRAWINGS

A more complete understanding of the present invention may be obtained from consideration of the following description in conjunction with the drawings in which.

Figure 2:
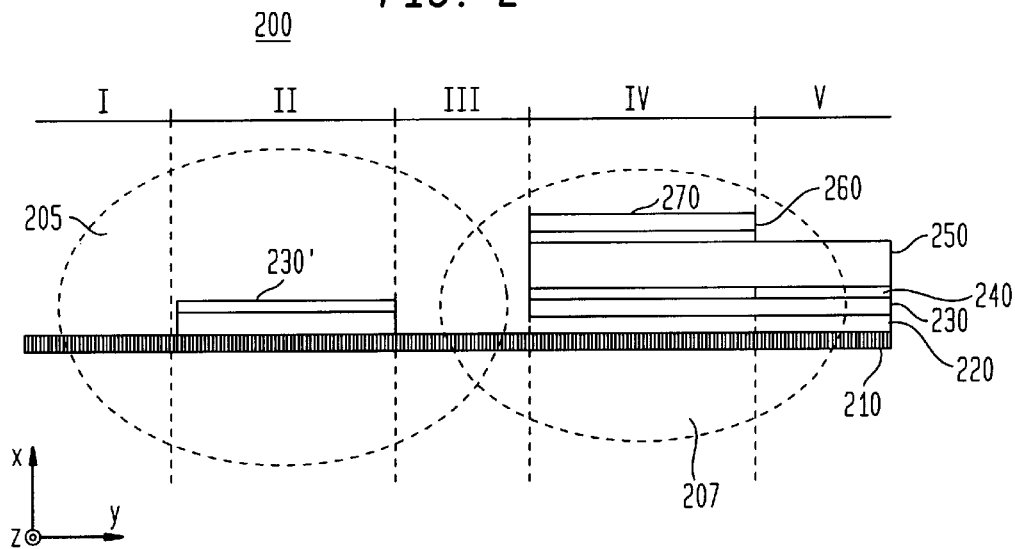
FIG. 2 is a schematic drawing of a present invention planar wavelength filter which also illustrates the optical field distribution.
Figure 3A:
Figure 3B:
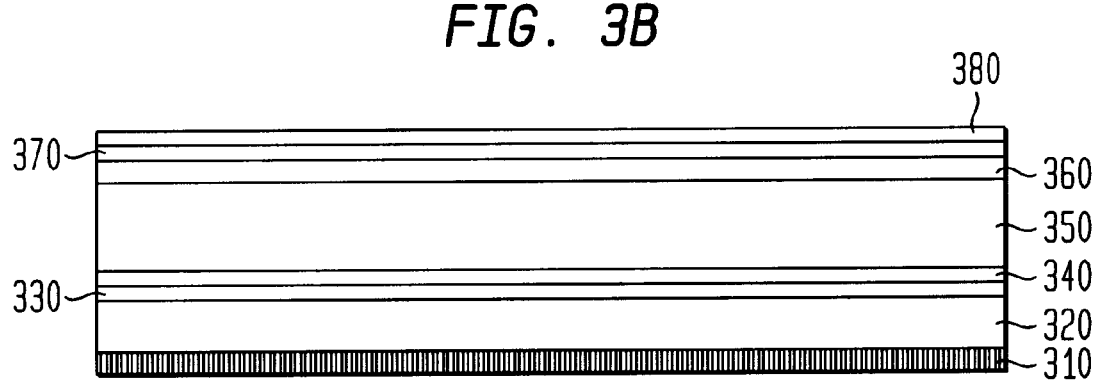
Figure 3C:
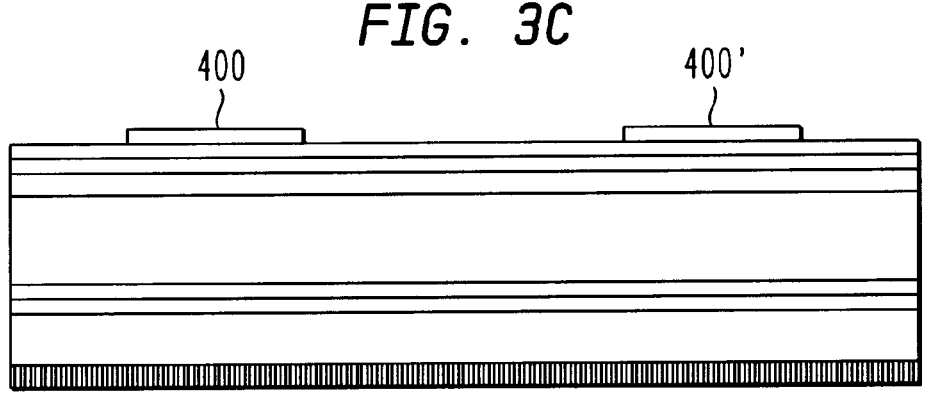
Figure 3D:
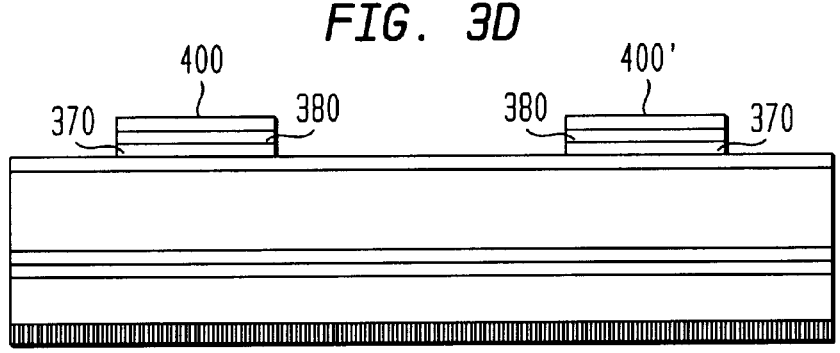
Figure 3E:
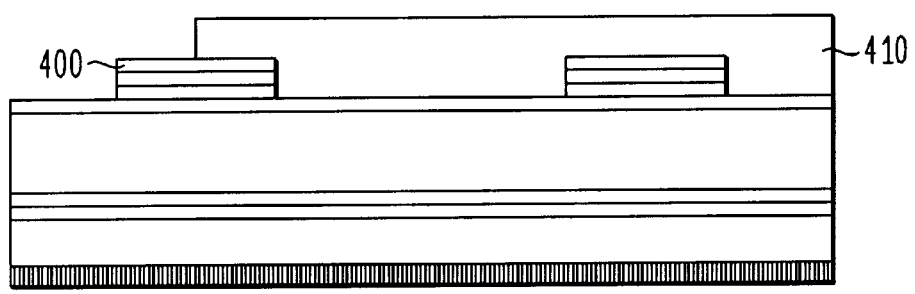
Figure 3F:
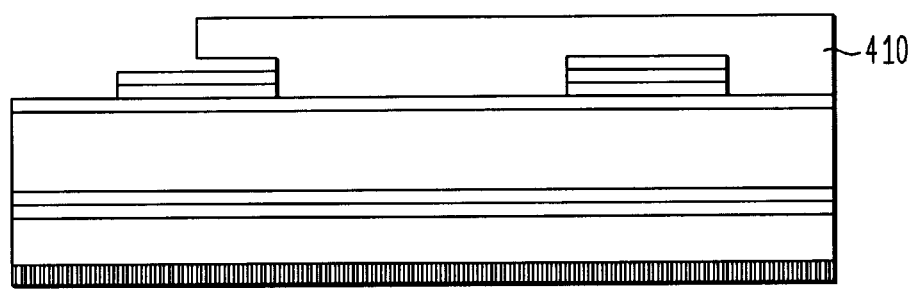
Figure 3G:
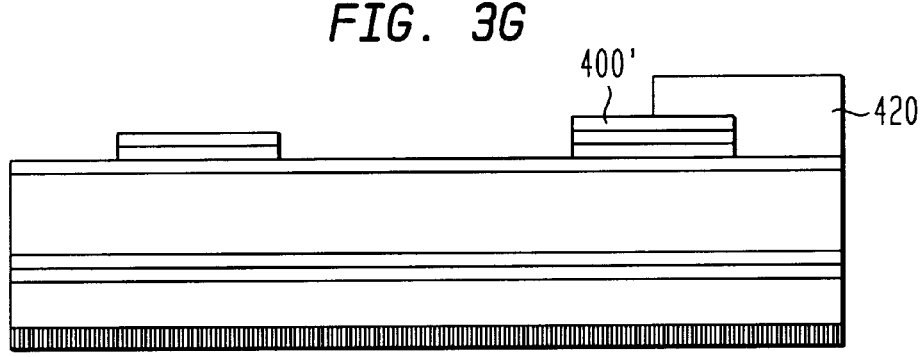
Figure 3H:
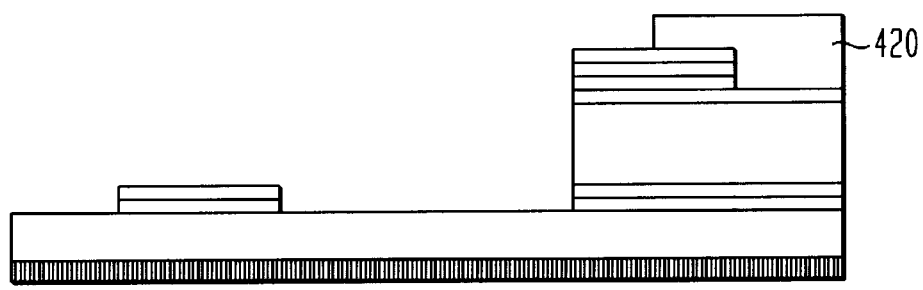
Figure 3I:
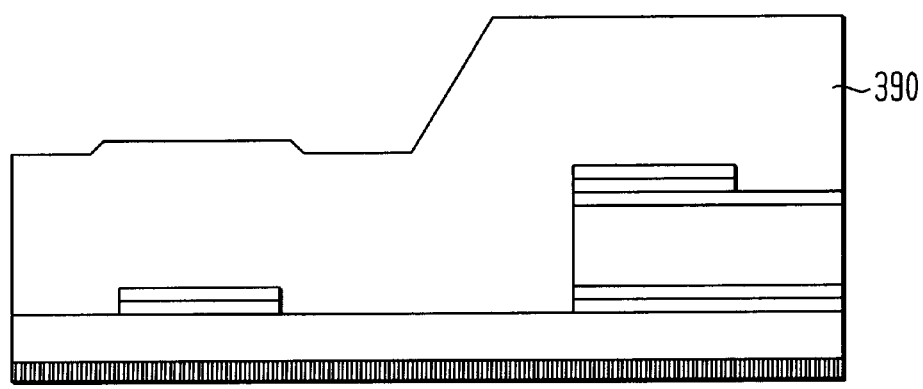

The step-by-step fabrication sequence of the planar wavelength filter as seen in FIG. 2 is better understood if reference is made to the schematic drawings of FIGS. 3A–3I:

FIG. 3A is a schematic drawing of the distributed Bragg reflection grating formed in a thin epitaxially grown InGaAsP layer 310;

FIG. 3B is a schematic drawing of the epitaxially grown lawyer stack consisting of alternate sequence of InP and InGaAsP layers 320, 330, 340, 350, 360, 370, and 380 on top of the previously formed grating;

FIG. 3C is a schematic drawing of the waveguide stripes formed in a first silicon dioxide masking layer 400 and 400';

FIG. 3D is a schematic drawing of the waveguides after removal of the top two layers by means of material selective etchants;

FIG. 3E is a schematic drawing of the deposition of a second masking layer 410 of photoresist defining the 'high index' versus the low 'index' waveguide;

FIG. 3F is a schematic drawing of the device after removal of the first masking layer 400 from the 'low index' waveguide;

FIG. 3G is a schematic drawing of a third masking layer 420 of photoresist covering half side of the 'high index' waveguide;

FIG. 3H is a schematic drawing of the horizontal filter after alternate etching of the InP and InGaAsP layers 330, 340, 350 and 360 by means of material selective etchants; and FIG. 3I is a schematic drawing of the completed wavelength filter after epitaxial regrowth of the upper InP cladding layer 390.

DETAILED DESCRIPTION OF THE INVENTION

The preferred embodiment of the present invention is discussed in detail below by giving specific steps, configurations and arrangements. It should be understood that this is done for illustrative purposes only and a person skilled in the filed of art will recognize that other steps, configurations and arrangements can be used without violating the spirit and scope of the invention. In particular, the herein discussed backward coupling fine-period distributed feedback grating (bragg grating) could be replaced by a coarse-period forward coupling grating.

Figure 1:
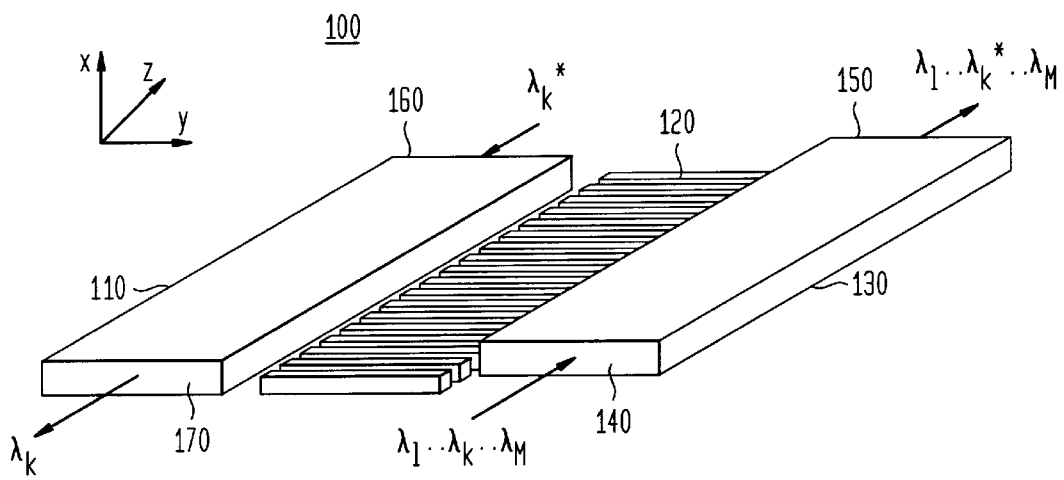
FIG. 1 is a schematic drawing of a planar wavelength filter arrangement.

Referring to FIG. 1, there is shown an exemplary arrangement for a coupled waveguide grating filter as a four port device 100. Device 100 includes a first waveguide 110, a second waveguide 130 and a distributed Bragg grating 120 for coupling therebetween. Various arrangements for the position of grating 120 are conceivable, with the constraint that the optical fields of waveguides 110 and 130 must simultaneously overlap in at least a portion of grating 120. Device 100 has a common input port 140, a common output port 150, a single input port 160 and a single output port 170. Operationally, light composed of various wavelengths $\lambda_1$ through $\lambda_M$ that is launched into common input port 140 passes unaffected through waveguide 130 except for wavelength $\lambda_k$, which lies in the reflection band of distributed Bragg grating 120. As such, $\lambda_k$ will be dropped from output port 170. On the other hand, wavelength $\lambda_k^*$ can be added to input port 160 and will be directed to common output port 150. Note that $\lambda_k$ and $\lambda_k^*$ denote the same wavelength however with different optical signals imposed on them.

For proper operation, waveguide 110 and waveguide 130 must have substantially different propagation constants in order: (1) to prevent co-directional coupling from waveguide 130 to waveguide 110 by synchronous coupling and therefore directing wavelengths $\lambda_1$ through $\lambda_M$ to port 160 and (2) to prevent retroreflection by the distributed Bragg grating into the same waveguide 130 and therefore redirecting wavelengths $\lambda_1$ through $\lambda_M$ to port 140. As calculated from equation (1) the optical bandwidth $\Delta\lambda = \lambda_M - \lambda_1$ is:

$$\frac{\Delta\lambda}{\lambda} = 1 - \left(\frac{2N_1}{N_1 + N_2}\right) \quad (2)$$

where M is the wavelength number and N is the index number.

According to a preferred embodiment of the present invention, a planar waveguide filter 200 is constructed from two strongly dissimilar waveguides placed in close proximity that are coupled by a common grating where the optical fields of waveguides 205 and 207 partially simultaneously overlap in distributed Bragg grating 210. Referring now to FIG. 2, there is shown a schematic drawing of the herein described filter device comprising the following elements: a low index waveguide 205, a high index waveguide 207 and distributed Bragg grating 210 that is common for both waveguides. Specifically, low index waveguide 205 is designed to have a low effective index consisting merely of a single thin InGaAsP stripe 230'. High index waveguide 207 is designed to have a high effective index consisting of a stack of alternating layers of InGaAsP 230, 250, 270 and InP 240, 260 in region IV. A special characteristic of filter 200 is its asymmetry with all the layers 230 through 270 removed in region III, and only layer 270 removed in region V.

In accordance with the present invention, a first advance in the field is accomplished by a horizontal arrangement of waveguides in close proximity with substantially different geometries and therefore substantially different effective indices of the waveguides. As is seen from equation (2) this results in a large optical bandwidth and, as can be shown by beam propagation techniques, in low crosstalk.

A numerical estimation of the index difference of the waveguides of the grating filter shown in FIG. 2 is presented below. For these calculations, the InGaAsP material was assumed to have a refractive index of 3.45 and the waveguides having a width of 3.5 micrometers. The thickness of layer 230' of low index waveguide 205 was assumed to be 0.1 micrometers. The total of the thicknesses of the relevant InGaAsP layers 230, 250 and 270 for the high index waveguide was assumed to be 0.5 micrometers. The InP layers 240 and 260 were neglected for these calculations. An effective index calculation yields the effective indices 3.10 and 3.33 for the low index 205 and high index 207 waveguides, respectively. From equation (2), the calculated optical bandwidth is 33.3 nanometers, which would easily fit 41 wavelength channels that are spaced by 100 GHz (0.8 nanometers) or 20 wavelength channels that are spaced by 200 GHz (1.6 nanometers).

In accordance with the present invention, a second advance in the field is accomplished by the asymmetric design of high index waveguide 207. The refractive index difference between regions IV and V is reduced by approximately a factor of 100 compared to the refractive index difference between regions III and IV. Therefore a wide waveguide stripe of several micrometers can be used while still maintaining single mode operation for this waveguide. Furthermore, the reduced refractive index difference relaxes overall fabrication tolerances and in particular, to those related to the waveguide width.

Referring now to FIGS. 3A–3I, a method in accordance with the present invention is outlined for the realization of the previously described and invented filter device. The sequence of the thicknesses of the epitaxial In and InGaAsP layers is crucial in easing the fabrication procedure, so as to take advantage of the material selective wet chemical etchants. These etchants, in combination with the InP and InGaAsP layers, allow a precise control of the etching process, for example, by stopping at well defined interfaces of the InP/InGaAsP grown layers. Furthermore, the fabrication sequence outlined herein is a self-aligned process, avoiding critical alignment steps for subsequent masking levels.

The fabrication sequence is as follows:

In a first processing step using metaloorganic vapour phase epitaxy, a thin InGaAsP layer 310 having a thickness of 50 nanometers is grown onto a InP substrate with a 2 inch diameter. A distributed Bragg grating is formed with reactive ion etching in this layer with a period of Λ=0.235, as shown in FIG. 3A.

In a second step, a layer stack consisting of an alternate sequence of InP and InGaAsP layers is deposited in a single growth step using metaloorganic vapour phase epitaxy over the previously formed grating, as shown in FIG. 3B. The thicknesses for each of the layers is: layer 320 is 100 nanometers, layer 330 is 100 nanometers, layer 340 is 15 manometers, layer 350 is 360 nanometers, layer 360 is 15 nanometers, layer 370 is 40 nanometers, and layer 380 is 15 nanometers.

In a third processing step, a layer of silicon dioxide ($SiO_2$) having a thickness of 100 nanometers is deposited by means of plasma enhanced chemical vapour deposition. $SiO_2$ waveguide stripes or masking layers 400 and 400', each having widths of 3.5 micrometers, are subsequently formed by photolithography, as shown in FIG. 3C.

In a fourth processing step, layers 380 and 370 are removed by using material selective hydrochloric etchant for the InP layer 380 followed by a sulfuric based etchant for the InGaAsP layer 370, as shown in FIG. 3D.

In a fifth processing step, a second masking layer 410 of photoresist, having a thickness of 1 micrometer, is deposited for covering $SiO_2$ masking layer 400' and half of $SiO_2$ masking layer 400, as shown in FIG. 3E.

In a sixth processing step, a hydrofluoric acid based etchant is used to remove $SiO_2$ masking layer 400 by undercutting the second photoresist masking layer 410, as shown in FIG. 3F. Neither the photoresist material 410 nor the InP/InGaAsP semiconductor material are attacked in this process.

In a seventh processing step, a third masking layer of photoresist 420, having a thicknesses of 1 micrometer, is deposited for covering half of $SiO_2$ masking layer 400', as shown in FIG. 3G.

In an eighth processing step, material selective hydrochloric acid based and sulfuric acid based etchants, starting with the hydrochloric acid based etchant to partially remove layers 360 and 380, are used in an alternating sequence until the wavelengths are formed as shown in FIG. 3H. For this procedure, the top of the remaining layer of the low index waveguide acts as a masking layer for the actual etching step and will be removed in the following etching step.

In a ninth processing step, the remaining first and third masking layers are removed, the wafer is cleaned and finally epitaxially overgrown with an upper InP cladding layer 390 having a thickness of 2 micrometers, as shown in FIG. 3I.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A wavelength filter, comprising:
   a low index waveguide;
   a high index waveguide in horizontal proximity to said low index waveguide, said low index waveguide and said high index waveguide having substantially different geometries resulting in substantially different indices; and
   a grating for coupling said low index waveguide to said high index waveguide.

2. The filter according to claim 1, wherein said high index waveguide is asymmetrical.

3. The filter according to claim 2, wherein said high index waveguide is a stack of alternating layers of InGaAsP/InP.

4. The filter according to claim 2, wherein said high index waveguide is a InGaAsP/InP core composite.

5. The filter according to claim 2, wherein said low index waveguide is a InGaAsP stripe.

6. The filter according to claim 2, wherein said grating is a backward coupling fine-period grating structure.

7. The filter according to claim 2, wherein said grating is a forward coupling coarse-period grating structure.

8. The filter according to claim 2, wherein:
   said low index waveguide is a InGaAsP stripe; and
   said high index waveguide is a stack of alternating layers of InGaAsP/InP.

9. An optical communications device, comprising:
   a first waveguide having a substantially low effective index;
   a second waveguide having a substantially high effective index, said second waveguide being in substantially horizontal proximity to said first waveguide, said substantially high effective index and said substantially low effective index being substantially different; and
   a horizontal common grating for coupling said first waveguide to said second waveguide.

10. The device according to claim 9, wherein said second waveguide is substantially asymmetrical.

11. The device according to claim 10, wherein said first waveguide is a InGaAsP stripe and said second waveguide is a stack of alternating layers of InGaAsP/InP.

12. The device according to claim 10, wherein said first waveguide is a InGaAsP stripe and said second waveguide is a InGaAsP/InP composite core.

13. The device according to claim 10, wherein said second waveguide is asymmetrical.

14. The device according to claim 10, wherein said horizontal common grating is selected from the group consisting of a retroreflective distributed feedback grating, and a coarse periodic co-directional grating.

* * * * *